United States Patent
Koo et al.

(10) Patent No.: US 9,851,271 B2
(45) Date of Patent: Dec. 26, 2017

(54) SENSOR AND METHOD OF MANUFACTURING THE SAME

(71) Applicant: Research & Business Foundation SUNGKYUNKWAN UNIVERSITY, Suwon-si (KR)

(72) Inventors: Jachoon Koo, Seoul (KR); Hyouk Ryeol Choi, Gunpo-si (KR); Hyungpil Moon, Seongnam-si (KR); Baek Chul Kim, Seoul (KR); Do Yeon Hwang, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 229 days.

(21) Appl. No.: 14/743,762

(22) Filed: Jun. 18, 2015

(65) Prior Publication Data

US 2016/0003694 A1     Jan. 7, 2016

(30) Foreign Application Priority Data

Jul. 2, 2014   (KR) ........................ 10-2014-0082592

(51) Int. Cl.
  *B25J 15/02*   (2006.01)
  *G01L 5/22*    (2006.01)
  *G01L 5/16*    (2006.01)
  *B25J 13/08*   (2006.01)
  *G01L 1/20*    (2006.01)

(52) U.S. Cl.
  CPC ............. *G01L 5/228* (2013.01); *B25J 13/084* (2013.01); *G01L 1/205* (2013.01); *G01L 5/161* (2013.01); *G01L 5/226* (2013.01); *Y10S 901/46* (2013.01)

(58) Field of Classification Search
  CPC ......... G01L 1/205; G01L 5/161; G01L 5/226; G01L 5/228; Y10S 901/33; Y10S 901/46; B25J 13/082; B25J 13/083; B25J 13/084
  USPC ........................ 73/763, 774, 776; 901/33, 46
  See application file for complete search history.

(56) References Cited

U.S. PATENT DOCUMENTS

| | | | |
|---|---|---|---|
| 2006/0016275 A1* | 1/2006 | Gravesen ................ | G06F 3/044 73/862.042 |
| 2007/0186642 A1* | 8/2007 | Sano .................... | A61B 5/0053 73/172 |
| 2014/0150572 A1* | 6/2014 | Lim ........................ | G01L 1/142 73/862.626 |

FOREIGN PATENT DOCUMENTS

| | | | | |
|---|---|---|---|---|
| JP | 2012-108021 A | 6/2012 | | |
| JP | 2013-96884 A | 5/2013 | | |
| JP | 2013-108832 A | 6/2013 | | |
| KR | 10-2011-0082465 A | 7/2011 | | |
| KR | 20110082465 A | * | 7/2011 | ............. G01D 21/02 |
| KR | 10-1261137 B1 | 5/2013 | | |

* cited by examiner

*Primary Examiner* — Benjamin Schmitt
(74) *Attorney, Agent, or Firm* — NSIP Law

(57) ABSTRACT

A sensor and a method of manufacturing the same are provided. The sensor includes a substrate, a projecting portion including a plurality of projections that protrude upwardly from an upper portion of the substrate, and an electrode portion covering the projections and the upper portion of the substrate between the projections. The projecting portion of the sensor has micro projections to enable the sensor to sense pressure and a sliding movement.

18 Claims, 7 Drawing Sheets

SENSOR AND METHOD OF MANUFACTURING THE SAME

CROSS-REFERENCE TO RELATED APPLICATION

This application claims the benefit under 35 USC §119 (a) of Korean Patent Application No. 10-2014-0082592, filed on Jul. 2, 2014, in the Korean Intellectual Property Office, the entire disclosure of which is incorporated herein by reference for all purposes.

1. FIELD

The following description relates to a sensor and a method of manufacturing the same, and to a micro-size sensor capable of detecting pressure applied thereto and a slipping movement, by using variations in electrical resistance, and a method of manufacturing the same.

2. BACKGROUND

Due to the recent development of robot industrial technologies, a demand exists for humanoid robots that are capable of performing various operations like a human being.

In order to appropriately grasp an object, such a humanoid robot needs to have a slip sensor able to detect a slipping movement on a contact end portion thereof corresponding to a human's finger like the touch sensors in a human being, so that a minimal level of frictional force may be provided on the contact end portion, whereby the humanoid robot may perform similar functions to those of a human being.

According to the requirements, various shaped sensors have been developed; however, a majority of the related art sensors have an overly complex structure or a huge size, causing difficulties in manufacturing processes and in reducing the size of the robot. Thus, it is difficult to attach the related art sensors to a hand of a humanoid robot.

RELATED ART DOCUMENT (Patent Document) Korean Patent Registration Publication No. 10-1261137

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a sensor includes a substrate, a projecting portion comprising a plurality of projections that protrude upwardly from an upper portion of the substrate, the projections comprising an elastic material, and an electrode portion comprising a conductive material and covering the projections and the upper portion of the substrate between the projections.

A height of the projections may be greater than an interval between the projections adjacent to each other, and the projections may tilt in response to horizontal force being applied thereto and the projections may return to original shapes thereof in response to the force being removed.

The projections may have a pattern like a fingerprint in a top plan view.

The projections may be formed integrally with the substrate.

The substrate and the projections may be formed of an elastic dielectric material.

The electrode portion may include a graphene material.

The general aspect of the sensor may further include a measuring portion configured to measure an electrical resistance value between one end and the other end of the electrode portion.

The general aspect of the sensor may further include a calculation portion configured to determine pressure applied to the sensor or a slipping movement on the sensor by analyzing the electrical resistance value measured by the measuring portion.

The upper portion of the substrate comprises a substantially planer surface, and the projections intermittently protrude from the substantially planer surface such that exposed portions between two adjacent projections are covered with the electrode portion.

In another general aspect, a method of manufacturing a sensor involves forming a substrate comprising an elastic dielectric material, forming a projecting portion including a plurality of projections formed of the elastic dielectric material on an upper portion of the substrate, and forming an electrode portion by covering the upper portion of the substrate on which the projections are formed with a conductive material.

The forming of the projecting portion may include pressing the upper portion of the substrate with a stamp having a plurality of recessed portions such that the plurality of projections are formed.

The stamp may have a regular pattern in which a depth of the recessed portions is greater than an interval between the recessed portions adjacent to each other.

The forming of the electrode portion may include applying a graphene material to the upper portion of the substrate on which the projections are formed, by using a spraying process, to thereby form the electrode portion.

The graphene material may be formed of graphene particles having a diameter smaller than a height of the plurality of projections and an interval between the projections.

Other features and aspects will be apparent from the following detailed description, the drawings, and the claims.

Figure 1:
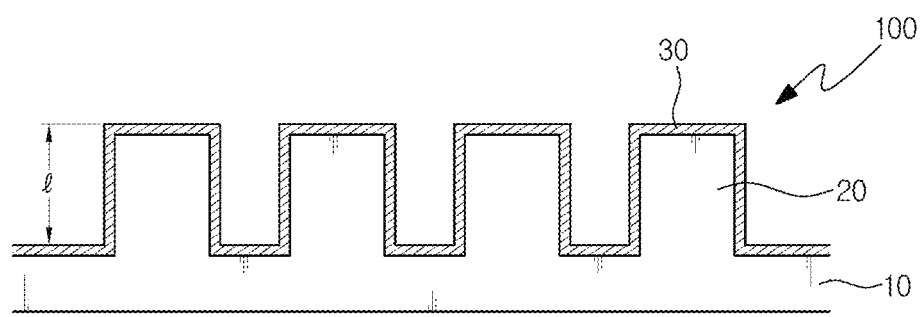
FIG. 1 is a cross-sectional view of a sensor according to a first embodiment of the present disclosure.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, a sensor and a method of manufacturing the same according to an embodiment of the present disclosure will be described in detail with reference to the attached drawings.

In the following description, only a portion required in understanding a sensor and a method of manufacturing the same according to an embodiment of the present disclosure will be provided, and the explanation of other portions will be omitted in order not to confuse the gist of the present disclosure.

Furthermore, unless defined otherwise, all the terms used in this specification including technical and scientific terms would be generally understood by those skilled in the related art. The terms defined in generally used dictionaries should be construed as having the same meanings as those construed in the context of the related art, and unless clearly defined otherwise in this specification, should not be construed as having idealistic or overly formal meanings.

An aspect of the present disclosure is to provide a sensor capable of sensing pressure applied thereto and/or a slipping movement by measuring a degree of electrical resistance varied according to the movement of projections having elasticity, and a method of manufacturing the same.

Another aspect of the present disclosure is to provide a sensor capable of having micro-size projections through an imprinting process and allowing for mass production thereof, and a method of manufacturing the same.

Another aspect of the present disclosure is to provide a sensor formed of an elastic dielectric material to provide substantially the same level of flexibility as that of a human skin and a method of manufacturing the same.

FIG. 1 is a cross-sectional view of a sensor according to a first embodiment of the present disclosure.

As illustrated in FIG. 1, a sensor 100 according to a first embodiment of the present disclosure may include a substrate 10, a projecting portion 20, and an electrode portion 30.

The substrate 10, which is a base portion of the sensor 100 according to the first embodiment of the present disclosure, may come into contact with a robot or the like, to which the sensor will be attached, on a lower surface thereof having no projections formed thereon. Thus, the substrate 10 may be configured to have flexibility in such a manner that the sensor according to an embodiment of the present disclosure may be smoothly attached to the robot or the like even in a case in which the contact surface of the substrate 10 is curved or uneven. Accordingly, the substrate may be formed of an elastic material or may have a small thickness.

The projecting portion 20 may be configured to include a plurality of projections formed on an upper surface of the substrate 10. As illustrated in FIG. 1, the projections may be formed to protrude upwardly from the upper surface of the substrate 10.

Figure 2:
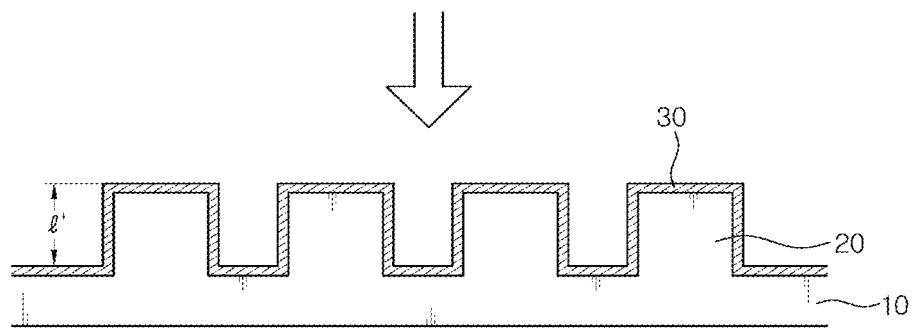
FIG. 2 is a view illustrating movement of the sensor according to the first embodiment of the present disclosure.

In addition, the projections may be formed of an elastic material and thus, when vertical force (force applied downwardly in a vertical direction in FIGS. 1 through 3, in other words, in a height direction of the projections) acts on the projections, the projections may be contracted (l>l') as illustrated in FIG. 2, while when the acting force is removed, the projections may need to return back to original shapes thereof.

The electrode portion 30 may be formed to cover an upper portion of the substrate 10 on which the projecting portion 20 is formed, and may need to have electrical conductivity in order to allow electric power to flow through the electrode portion 30.

For example, even in a case in which the electrode portion 30 is formed to cover the upper portion of the substrate on which the projections are formed, the projections may need to maintain ductility such that they may be contracted at the time of applying vertical force thereto as illustrated in FIG. 2 while returning back to the original shapes thereof when the applied force is removed. To this end, the electrode portion 30 may be thinly formed on the upper surface of the substrate on which the projections are formed, and may be formed of a material unbreakable even in the case of repeated movements of the projections.

The sensor according to the first embodiment of the present disclosure as described above may be operated as a pressure sensor able to determine whether or not pressure is applied onto the sensor, and in this case, the determination on whether or not pressure is applied may be made by measuring a level of electrical resistance between one end and the other end of the electrode portion 30.

Figure 3A:
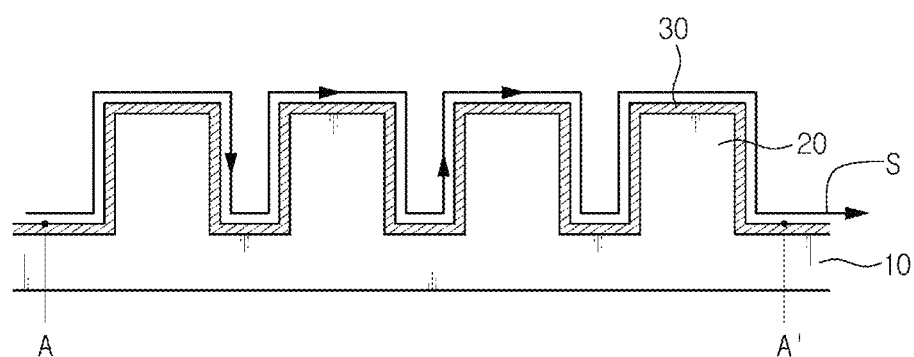
FIGS. 3A and 3B are views illustrating variations in electrical path when vertical force is applied to the sensor according to the first embodiment of the present disclosure.
Figure 3B:
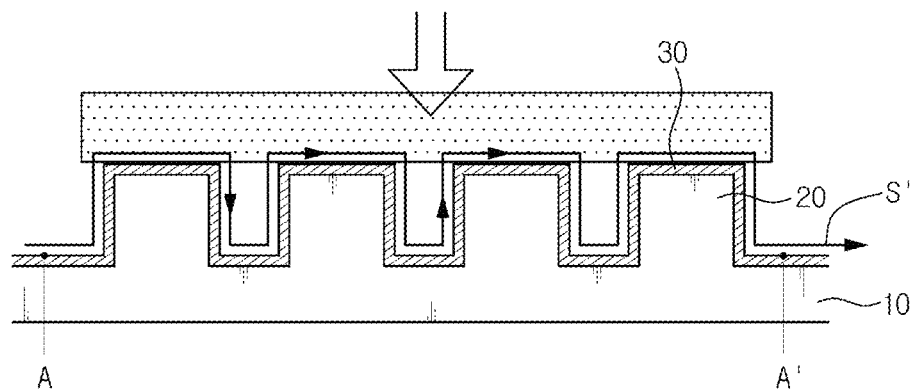

When no pressure acts on the sensor as illustrated in FIG. 3A, an electrical path extending from point A to point A' may be denoted by reference numeral S. However, when an object (O) contacts the sensor and the pressure thereof is applied to the sensor, vertical force acts on the sensor as illustrated in FIG. 3B, whereby the projections may be contracted. In this case, an electrical path extending from point A to point A' may be denoted by reference numeral S' and a length thereof may be shortened as compared to that of the electrical path S formed in the case of having no pressure. Thus, a degree of electrical resistance in the electrical path extending from point A to point A' in the electrode portion may be reduced at the time of applying pressure, and the occurrence of a slipping movement may be determined using variations in electrical resistance as described above.

Thus, a robot having a hand to which the sensor according to the first embodiment of the present disclosure is attached may sense whether or not the hand thereof comes into contact with an object, like a hand of a human being.

Figure 4:
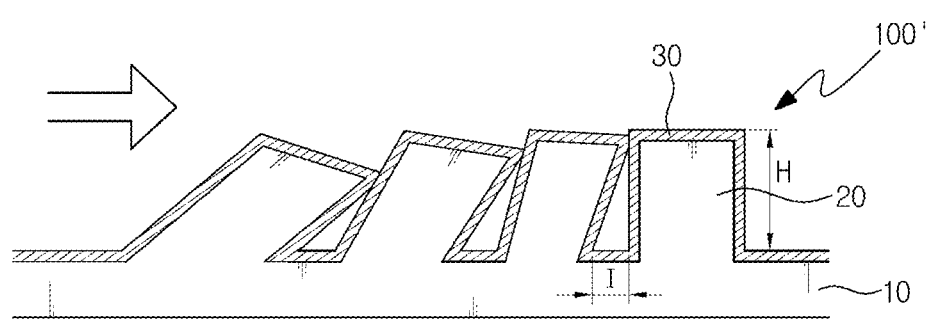
FIG. 4 is a view illustrating movement of a sensor according to a second embodiment of the present disclosure.

FIG. 4 illustrates a sensor 100' according to a second embodiment of the present disclosure.

Unlike in the sensor according to the first embodiment, in the case of the sensor according to the second embodiment of the present disclosure, projections of a projecting portion 20 may be tilted when horizontal force (force applied in a horizontal direction in FIG. 4, in other words, in a direction perpendicular with respect to a height direction of the projections) acts on the sensor as illustrated in FIG. 4, while when the acting force is removed, the projections may return back to original shapes thereof.

To this end, in the same manner as that of the first embodiment, the projections may be formed of an elastic material and heights H of the plurality of projections may be greater than intervals I therebetween in order to allow contact between the projections to be described later.

In the sensor according to the second embodiment of the present disclosure, since other configurations thereof except for the projecting portion are identical to those of the first embodiment, a description thereof will be omitted.

The sensor according to the second embodiment of the present disclosure as described above may be operated as a slip sensor capable of determining whether or not a slipping movement occurs, and in this case, the determination on whether or not the slipping movement occurs may be determined by measuring a degree of electrical resistance between one end and the other end of the electrode portion 30.

Figure 5A:
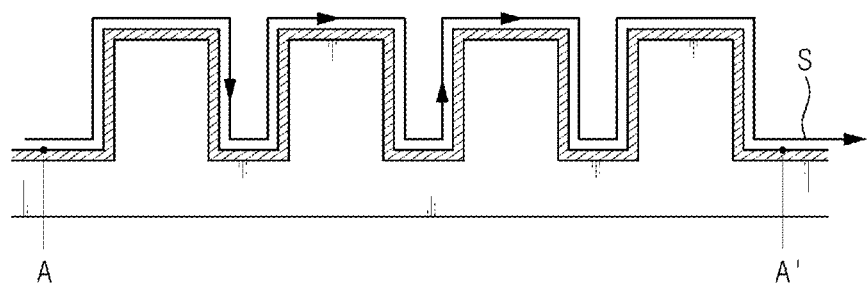
FIGS. 5A and 5B are views illustrating variations in electrical path when horizontal force is applied to the sensor according to the second embodiment of the present disclosure.
Figure 5B:
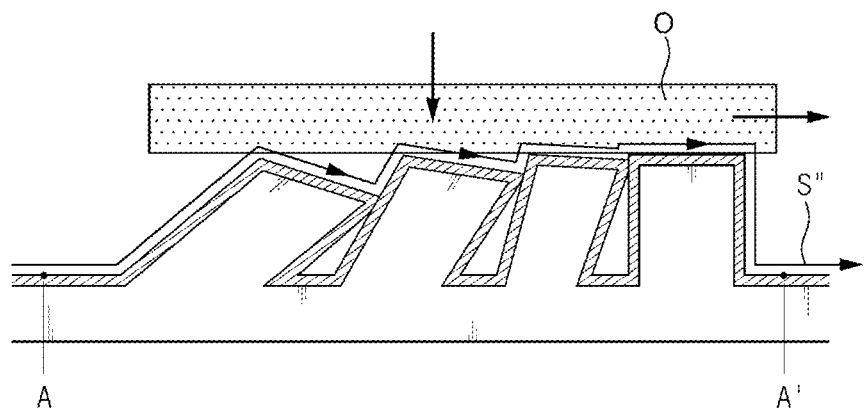

In more detail, when a slipping movement does not occur as illustrated in FIG. 5A, an electrical path extending from point A to point A' in the electrode portion may be denoted by reference numeral S. However, when the object O may contact the sensor and slip over the sensor, horizontal force is applied to the sensor as illustrated in FIG. 5B, whereby the projections may be tilted and thus, the projections adjacent to each other may come into contact with each other.

In this case, an electrical path extending from point A to point A' may be denoted by reference numeral S" and a length thereof may be shortened as compared to that of the electrical path S formed in the case in the which the slipping movement does not occur. Accordingly, a degree of electrical resistance in the electrical path extending from point A to point A' in the electrode portion may be reduced at the time of applying pressure, and the occurrence of a slipping movement may be determined using variations in electrical resistance as described above.

Thus, the robot having a hand to which the sensor according to the second embodiment of the present disclosure is attached may determine whether or not an object gripped by the hand slips over the hand and in this case, may prevent the gripped object from being separated from the hand by increasing a degree of gripping force.

The sensor according to the embodiments of the present disclosure may be manufactured by the method illustrated in FIG. 6, which will be described in detail as follows.

Figure 6A:
FIGS. 6A through 6E are views illustrating a method of manufacturing the sensor according to an embodiment of the present disclosure.

First, as illustrated in FIG. 6A, the substrate 10 to serve as a base portion of the sensor may be formed (S1: a process of forming the substrate).

The substrate 10 may be formed of a material having contractibility while having a reduced thickness as described above, preferably, an elastic dielectric material such as nitrile butadiene rubber (NBR). In the case of forming the substrate 10 formed of nitrile butadiene rubber (NBR), an NBR solution may be applied and subsequently, the applied solution may be baked in an oven to thereby form the substrate 10 having a thin film shape.

Then, the plurality of projections may be formed on the upper portion of the substrate 10 (S2: a process of forming the projections).

The projections may be formed separately from the substrate 10 and be attached to the upper portion of the substrate 10, but may be formed integrally with the substrate 10, since both the substrate and the projections need to be formed of an elastic material and the projections should not be separated from the substrate even in the case in which the projections are tilted or contracted by external force and then, are restored to the original shapes thereof.

Figure 6B:
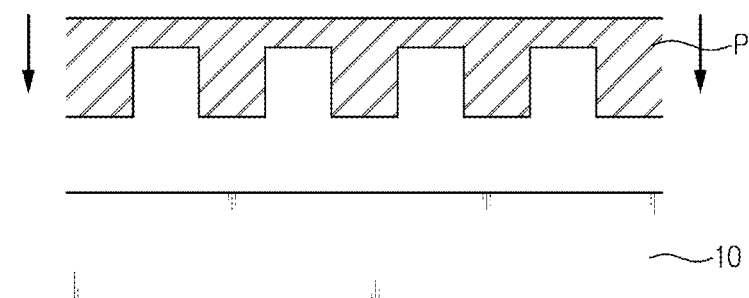
Figure 6C:
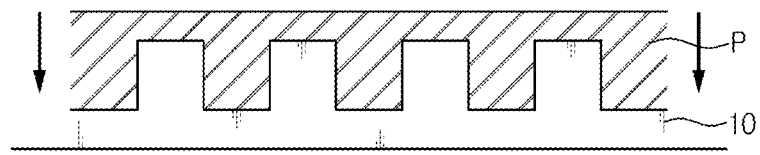
Figure 6D:
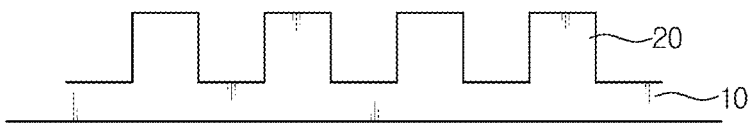
Figure 6E:
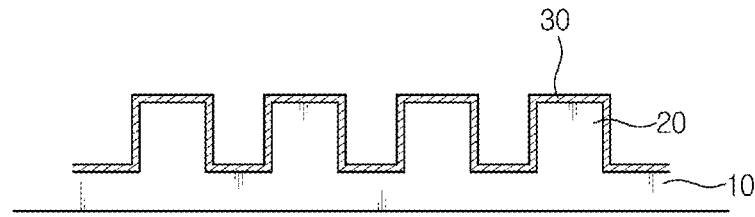

To this end, as illustrated in FIGS. 6B through 6D, the projecting portion 20 may be formed using an imprinting method.

That is, a stamp P having a plurality of recessed portions corresponding to shapes of projections to be formed may be prepared, and the upper portion of the substrate 10 is pressed by the stamp P within an imprinting pneumatic chamber (not shown) and subsequently, the stamp P is removed from the substrate, such that the plurality of projections corresponding to the recessed portions of the stamp P may be formed on the substrate 10.

The heights of the projections and the intervals therebetween may be scaled such that the upper portion of the substrate 10 is substantially planer when viewed in magnification. The substrate 10, however, may be flexible to be curved and attached to a hand of a robot, for example.

In order to form the electrode portion 30 on the upper portion of the substrate having the plurality of projections formed thereon, a graphene material may be uniformly applied to the upper portion of the substrate using a spraying process (S3: a process of forming the electrode portion).

Figure 7A:
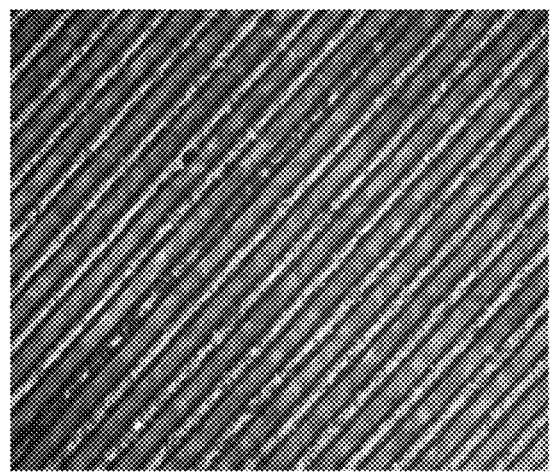
FIGS. 7A and 7B are images obtained by capturing a sensor manufactured according to the sensor manufacturing method according to an embodiment of the present disclosure, using a microscope.
Figure 7B:
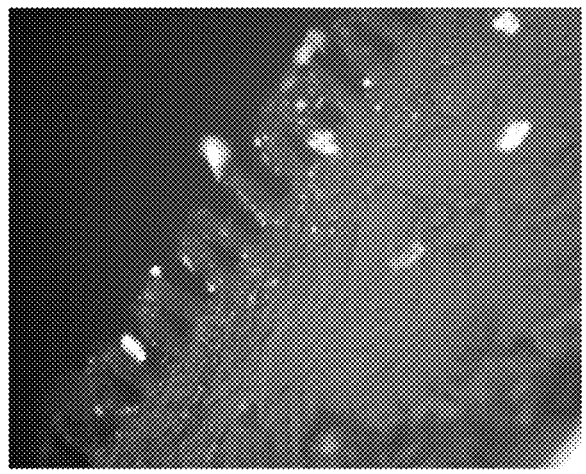
Figure 8:
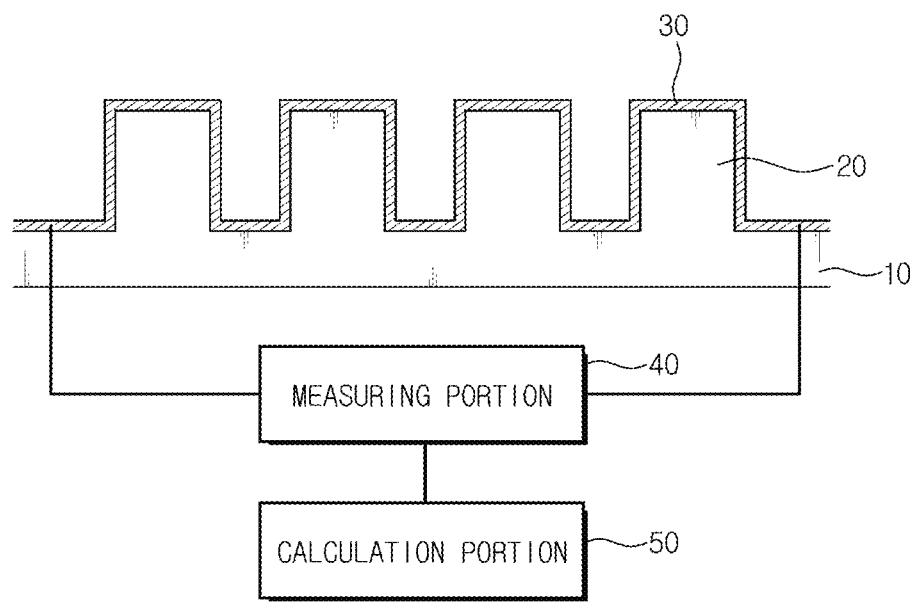
FIG. 8 is a configuration view of a sensing apparatus using the sensor according to an embodiment of the present disclosure.

FIGS. 7A and 7B show images obtained by capturing the sensor according to the embodiment of the present disclosure manufactured by the method as described above.

Since the sensor according to the embodiment of the present disclosure may have projections formed by an imprinting method, widths of the projections and intervals between the projections may be formed to have micro-sizes, less than a fingerprint size of a human. The recessed portions of the stamp P used to form the sensor illustrated in FIG. 7 may have a depth of 70 μm, and an interval between the recessed portions may be 20 μm. However, the depth or height of the projections may vary. For instance, according to one example, the height of the projections may range between 10 μm to 150 μm or 30 μm to 100 μm. According to another example, the height of the projections may not be completely uniform and the uneven height may range between 10 μm to 150 μm or 30 μm to 100 μm. According to yet another example, the interval between the projections and the thickness of the projections may range between 5 μm to 100 μm or 10 μm to 50 μm. According to another example, a combination of the above described heights of projections and intervals may be found in the sensor.

In addition, since the graphene material used to form the electrode portion 30 may have nano-sized particles, even in a case in which the projections are formed to have a micro-size and then, the electrode portion is formed thereon, shapes of the projections having a micro-size may be maintained.

Thus, the stamp P may be prepared by forming a plurality of recesses having a pattern like a human's fingerprint when viewed in a plan view, and the sensor according to the embodiment of the present disclosure may be fabricated by using the stamp P and be then, attached to a humanoid robot, whereby the humanoid robot may sense contact with an object and a slip of the object thereon, in a similar manner to the case of a human being.

The pattern of the stamp P can vary. For example, while FIG. 7 illustrates an imprinting method that results in several parallel projections in the top plan view, in another example, the stamp P may have an imprinted pattern that includes curves or shorter projections in the top plan view. Also, the upper tip of the projections may be rectangular or round. Various imprinted patterns may be adopted based on the application of the sensor.

In addition, the sensor according to an embodiment of the present disclosure may have a simple structure as illustrated in FIG. 1. Further, in terms of the manufacturing method of the sensor, if once the stamp p is manufactured, since the manufactured stamp P may be repeatedly used to press the substrate and transfer a shape thereof to the substrate, micro-sized sensors may be simply mass produced.

In the case that the sensor according to an embodiment of the present disclosure manufactured as described above may be attached to the robot, and a measuring portion 40 measuring a degree of electrical resistance between one end and the other end of the electrode portion 30 may be provided, a calculation portion 50 such as a control unit of the robot may determine whether or not contact and/or a slipping movement occurs on a portion of the robot to which the sensor is attached, using a resistance value measured by the measuring portion 40.

The measuring portion 40 and the calculation portion 50 may include one or more circuits, transistors, non-transitory memory storages, computer processing devices or processors. The control unit of the robot may include one or more circuits, transistors, non-transitory memory storages, computer processing devices or processors used to implement the measuring portion 40 and the calculation portion 50.

The sensors according to embodiments of the present disclosure may be classified as the sensor according to the first embodiment, capable of sensing pressure applied thereto, and the sensor according to the second embodiment, capable of sensing a slipping movement thereon. However, in the sensor 100 manufactured by the manufacturing method according to an embodiment of the present disclosure, in the case that the height of the projections is greater than the interval between the projections, the sensor 100 may have both characteristics according to the first embodiment and the second embodiment.

Figure 9:
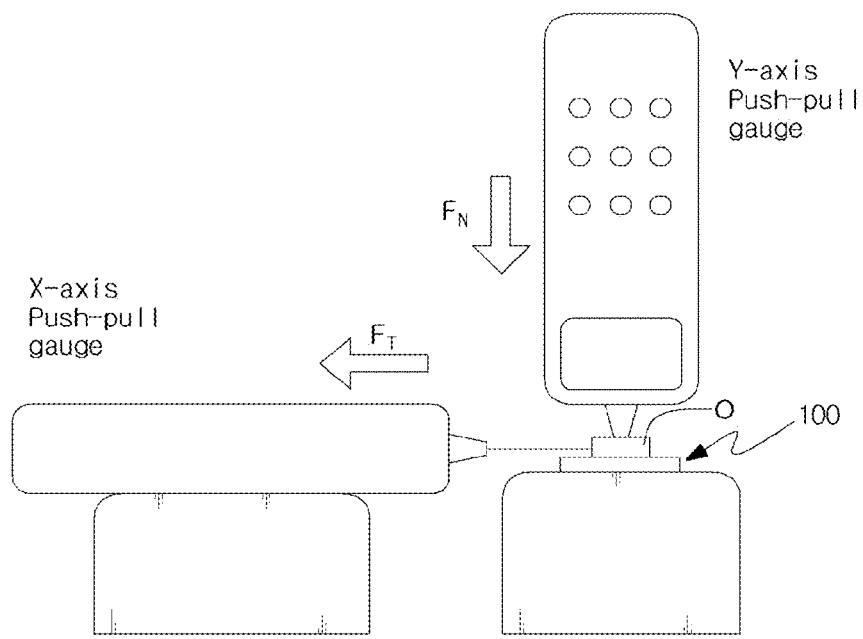
FIG. 9 is a schematic view of an experimental system for testing the sensor according to an embodiment of the present disclosure.

That is, in the case that the projections are formed of an elastic material, the projections may be tilted by horizontal force and be contacted by vertical force, and then, may return to initial shapes thereof when the force is removed, whereby the sensor may sense both the pressure applied thereto and the occurrence of a slipping movement. With regard to this, experimentation was performed by a method illustrated in FIG. 9.

The experimental method will be described in detail as follows. After the object O was placed on the sensor 100 and a constant amount of vertical force $F_N$ was applied to the sensor 100 using a Y-axial push-pull gage to generate a predetermined amount of frictional force, horizontal force $F_T$ was exerted by a X-axial push-pull gage to cause a slipping movement and at this time, variations in electrical characteristics of the sensor were measured. In order to determine an instant at which the object O slipped over, the movement of the object O was determined using a laser displacement measuring device.

Figure 10:
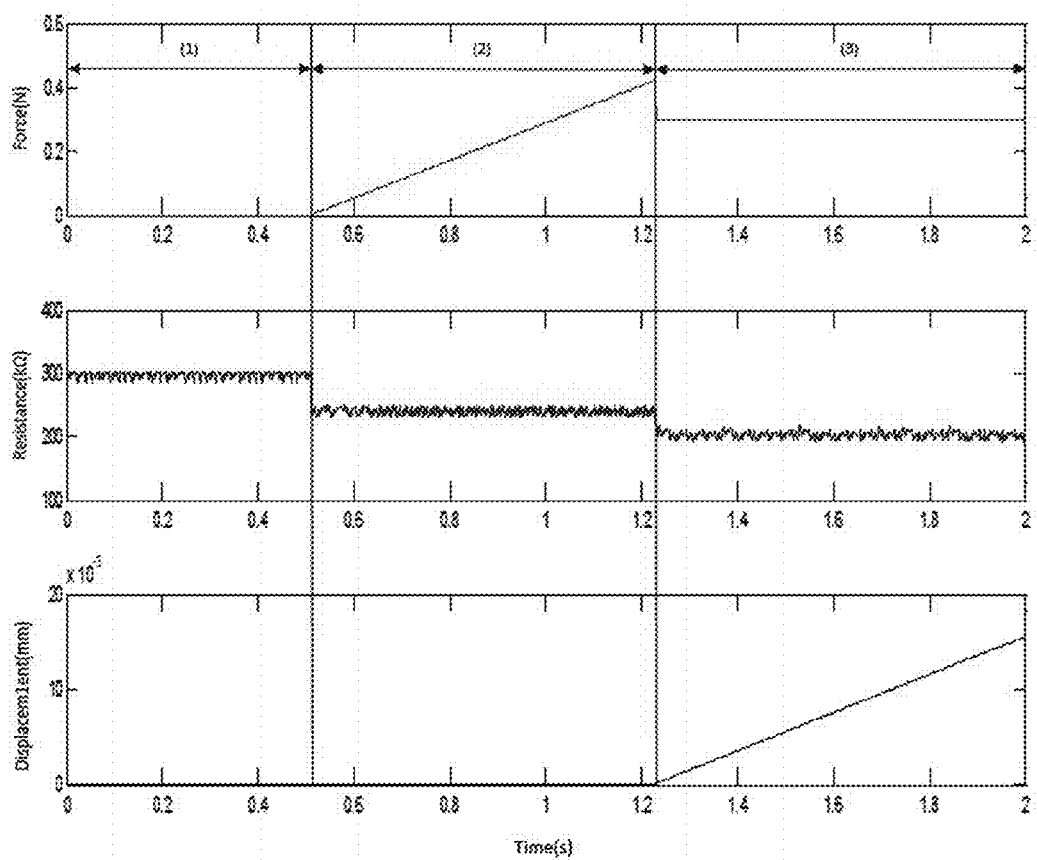
FIG. 10 is a graph diagram illustrating degrees of frictional force, values of electrical resistance in the sensor and displacement measured by a laser displacement measuring sensor, in the experiment illustrated in FIG. 9.

As a result, in a section (section (1)) in which no force was applied to the sensor as illustrated in FIG. 10, variations in resistance value of the sensor were not present. On the other hand, when the object and the sensor come into contact with each other and vertical force was applied to the sensor (at approximately, 0.5 seconds, please refer to a top graph in FIG. 10), it could be confirmed that the resistance value of the sensor was reduced (please refer to a middle graph in FIG. 10). In this case, since no displacement was measured by the laser displacement measuring device, it could be confirmed that the sensor according to an embodiment of the present disclosure may sense external pressure without a slipping movement being caused.

In addition, in a section (section (2)) in which external force was continuously applied to the sensor but a slipping movement did not occur, it could be confirmed that the reduced resistance value of the sensor was continuously maintained and at an instant at which the slipping movement occurred (at approximately, 1.25 seconds), it could be confirmed that the resistance value was further reduced again. Accordingly, it could also be confirmed that the sensor according to an embodiment of the present disclosure may sense a slip movement.

According to embodiments of the present disclosure, a sensor capable of sensing pressure applied thereto and/or a slipping movement thereon by measuring a degree of electrical resistance varied according to the movement of projections having elasticity, the sensor having a micro-size while allowing for mass production thereof as well as realizing substantially the same level of flexibility as that of a human' skin, and a method of manufacturing the sensor may be provided.

The apparatuses, units and portions described herein may be implemented using hardware components. The hardware components may include, for example, circuits, transistors, controllers, sensors, processors, generators, drivers, non-transitory memory storage and other equivalent electronic components. The hardware components may be, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device may be used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor, comprising:
a substrate;
a projecting portion comprising projections that protrude from an upper portion of the substrate in a first direction; and
an electrode portion comprising a conductive material and covering the projections and the upper portion of the substrate between the projections,
wherein the electrode portion comprises a continuous undulating cross section spanning from a first point on the substrate to a second point on the substrate, and
wherein the projections comprise an elastic material and are configured to tilt in response to a horizontal force being applied to the projections.

2. The sensor according to claim 1, wherein a height of the projections is greater than an interval between adjacent projections among the projections, and the projections are configured to return to original shapes of the projections in response to the horizontal force being removed.

3. The sensor according to claim 2, wherein the projections comprise a fingerprint pattern in a top plan view.

4. The sensor according to claim 2, wherein the projections are integrally formed with the substrate.

5. The sensor of claim 4, wherein the substrate and the projecting portion are solid.

6. The sensor according to claim 2, wherein the substrate and the projections are formed of an elastic dielectric material.

7. The sensor according to claim 2, wherein the electrode portion comprises a graphene material.

8. The sensor according to claim 2, further comprising a measuring circuit configured to measure an electrical resistance value between an end and another end of the electrode portion.

9. The sensor according to claim 8, further comprising a calculation circuit configured to determine pressure applied to the sensor or a slipping movement on the sensor by analyzing the electrical resistance value measured by the measuring portion.

10. The sensor according to claim 2, wherein the upper portion of the substrate comprises a substantially planer surface, and the projections intermittently protrude from the substantially planer surface such that exposed portions between two adjacent projections among the projections are covered with the electrode portion.

11. The sensor according to claim 1, wherein the projections comprise a fingerprint pattern in a top plan view.

12. The sensor according to claim 1, wherein the projections are integrally formed with the substrate.

13. The sensor according to claim 1, wherein the substrate and the projections are formed of an elastic dielectric material.

14. The sensor according to claim 1, wherein the electrode portion comprises a graphene material.

15. The sensor according to claim 1, further comprising a measuring circuit configured to measure an electrical resistance value between an end and another end of the electrode portion.

16. The sensor according to claim 15, further comprising a calculation circuit configured to determine pressure applied to the sensor or a slipping movement on the sensor by analyzing the electrical resistance value measured by the measuring portion.

17. A sensor, comprising:
a substrate;
a projecting portion comprising projections that protrude from an upper portion of the substrate in a first direction, wherein the projections comprise an elastic material; and
an electrode portion comprising a conductive material and covering the projections and the upper portion of the substrate between the projections,
wherein the electrode portion comprises a continuous undulating cross section spanning from a first point on the substrate to a second point on the substrate,
wherein the electrode portion is configured to conduct current in a path from the first point to the second point, and
wherein the path is configured to shorten in response to a compression force being applied to the sensor in a second direction opposite to the first direction.

18. The sensor of claim 17, wherein the path is shortened in response to a shear force being applied to the sensor in a second direction perpendicular to the first direction, due to a first segment of the electrode portion covering a first projection among the projections bending to contact a second segment of the electrode portion covering a second projection among the projections.

* * * * *